United States Patent
Chou et al.

(10) Patent No.: US 6,241,142 B1
(45) Date of Patent: Jun. 5, 2001

(54) WELDING DEVICE FOR NET MEMBER

(76) Inventors: Chun Pao Chou; Ching Jung Huang, both of No. 6, Avenue 25, Lane 25, Guo Jong 1st Road, Da Li City, Taichung Hsien, 412 (TW)

( * ) Notice: Subject to any disclaimer, the term of this patent is extended or adjusted under 35 U.S.C. 154(b) by 0 days.

(21) Appl. No.: 09/556,376

(22) Filed: Apr. 24, 2000

(51) Int. Cl.[7] .............................. B23K 37/02; B21F 15/10
(52) U.S. Cl. ...................... 228/47.1; 228/44.3; 140/112; 219/56
(58) Field of Search .................................. 228/47.1, 44.3, 228/182, 173.5, 212; 219/56, 87; 140/112

(56) References Cited

U.S. PATENT DOCUMENTS

| | | | |
|---|---|---|---|
| 2,422,829 | * | 6/1947 | Fotie . |
| 3,815,218 | * | 6/1974 | Palmer . |
| 3,886,646 | * | 6/1975 | Broderson . |
| 3,889,345 | * | 6/1975 | Hirschberg . |
| 4,319,112 | * | 3/1982 | Connolly . |
| 4,343,981 | * | 8/1982 | Connolly . |
| 4,748,309 | * | 5/1988 | Ritter et al. . . |
| 5,372,972 | * | 12/1994 | Hayashi et al. . . |
| 5,446,254 | * | 8/1995 | Ritter et al. . . |
| 5,647,110 | * | 7/1997 | Ritter et al. . . |
| 5,820,013 | * | 10/1998 | Ortiz . |
| 6,036,076 | * | 3/2000 | Royle . |
| 6,045,031 | * | 4/2000 | Ritter et al. . . |

* cited by examiner

Primary Examiner—Patrick Ryan
Assistant Examiner—Jonathan Johnson
(74) Attorney, Agent, or Firm—Charles E. Baxley

(57) ABSTRACT

A welding device includes a number of welding members disposed on a bases and a frame slidably supported in the base for supporting wires to be welded together. A moving device may move the frame between the welding members for allowing the wires to be welded together by the welding members. A removing device may remove the wires from the frame after the wires are welded together. An elevating device may elevate the frame for allowing the other frame to be moved through the frame and for allowing the other wires to be welded together by the welding members.

15 Claims, 6 Drawing Sheets

WELDING DEVICE FOR NET MEMBER

BACKGROUND OF THE INVENTION

1. Field of the Invention

The present invention relates to a welding device, and more particularly to a welding device for net members.

2. Description of the Prior Art

Typical nets comprise a number of wires arranged cross to each other and required to be welded together at the joints. The wires of the typical nets may not be welded and secured together quickly.

The present invention has arisen to mitigate and/or obviate the afore-described disadvantages of the conventional welding devices for net members.

SUMMARY OF THE INVENTION

The primary objective of the present invention is to provide a welding device for quickly welding the wires into the net member.

In accordance with one aspect of the invention, there is provided a welding device comprising a base, a plurality of welding members provided on the base, a frame for supporting a plurality of wires to be welded together, means for moving the frame between the welding members, and means for actuating the welding members to weld the wires together, such that the wires may be quickly welded to form the required net members.

The base includes means for slidably supporting the frame in the base. The supporting means includes a pair of tracks disposed in the base for slidably supporting the frame. The tracks each includes a plurality of rollers provided thereon for engaging with the frame.

The moving means includes a belt slidably received in the base, means for moving the belt, and a clamping device disposed on the belt and movable in concert with the belt for clamping the frame and for allowing the frame to be moved by the belt moving means via the belt and the clamping device. The frame includes a handle, the belt includes an actuator secured thereon, the clamping device is secured to the actuator.

A device is further provided for removing the wires from the frame and includes a table slidably received in the base, a removing member disposed on the table, means for moving the table up and down to remove the wires from the frame.

A device is further provided for guiding the table to move up and down relative to the frame. A device is further provided for preventing the table from rotating relative to the frame.

A device is further provided for elevating the frame and includes a pair of slides, two actuators disposed on the slides respectively and each having a piston rod extendible to engage with the frame and to retain the frame in place, and means for moving the slides up and down to move the frame up and down. The elevating means includes a pair of brackets slidably supported in the base and each having at least one rail extended therefrom for slidably supporting the slide respectively. The base includes a pair of tracks disposed therein for slidably supporting the frame, the tracks each includes at least one depression formed therein for slidably receiving the piston rod of the actuator respectively.

A second frame is further provided for slidably supported in the base for supporting wires to be welded together and for moving the wires between the welding members.

Further objectives and advantages of the present invention will become apparent from a careful reading of a detailed description provided hereinbelow with appropriate reference to accompanying drawings.

DETAILED DESCRIPTION OF THE PREFERRED EMBODIMENT

Figure 1:
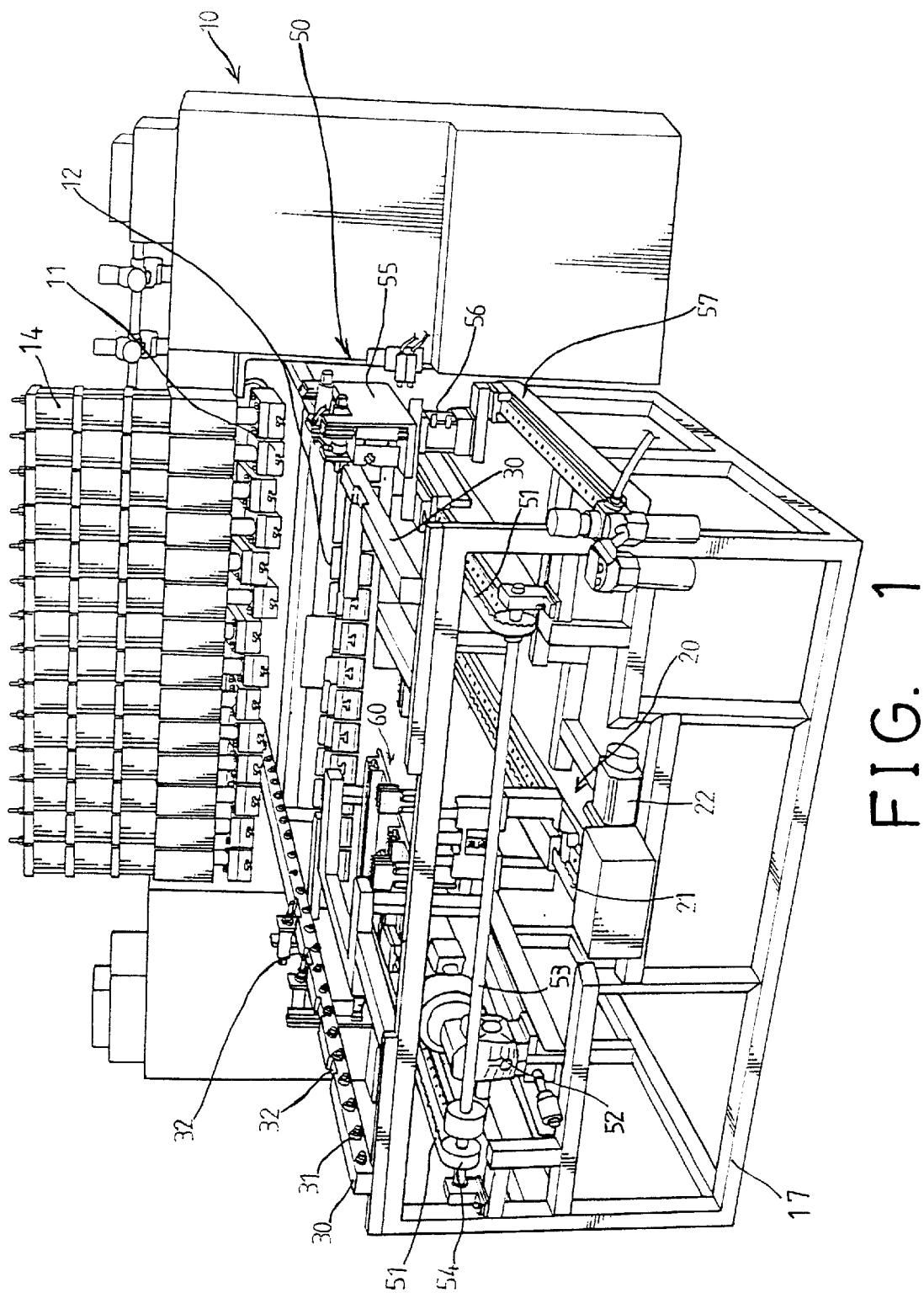
FIG. 1 is a perspective view of a welding device in accordance with the present invention.

Referring to the drawings, and initially to FIGS. 1–5, a welding device in accordance with the present invention as shown in FIG. 1 is generally designated with the reference numeral "10" and is provided for welding the wires 80 of a net member (FIG. 5) together. The welding device 10 comprises a base 17 having a moving device 20 provided therein. The moving device 20 includes a belt 21, such as a v-belt, a feed belt, an endless belt or the like, slidably supported in the base 17. A seat 23 (FIG. 2) is secured on the belt 21 by such as fasteners. An actuator 24, such as a hydraulic or pneumatic cylinder, is disposed on the seat 23 and includes one or more piston rods 241 extended upward therefrom. One or more hooks or clamping devices 26 are secured to the pistons rods 241 with a support 25. A motor 22 or the like is coupled to the belt 21 for moving the belt 21 and the seat 23. The welding device 10 includes a number of upper welding members 11 and a number of lower welding members 12 arranged below the upper welding members 11, and includes a number of actuators 14, such as the hydraulic or pneumatic cylinders coupled to the respective welding members 11, 12 for moving the welding members 11, 12 up and down.

Figure 2:
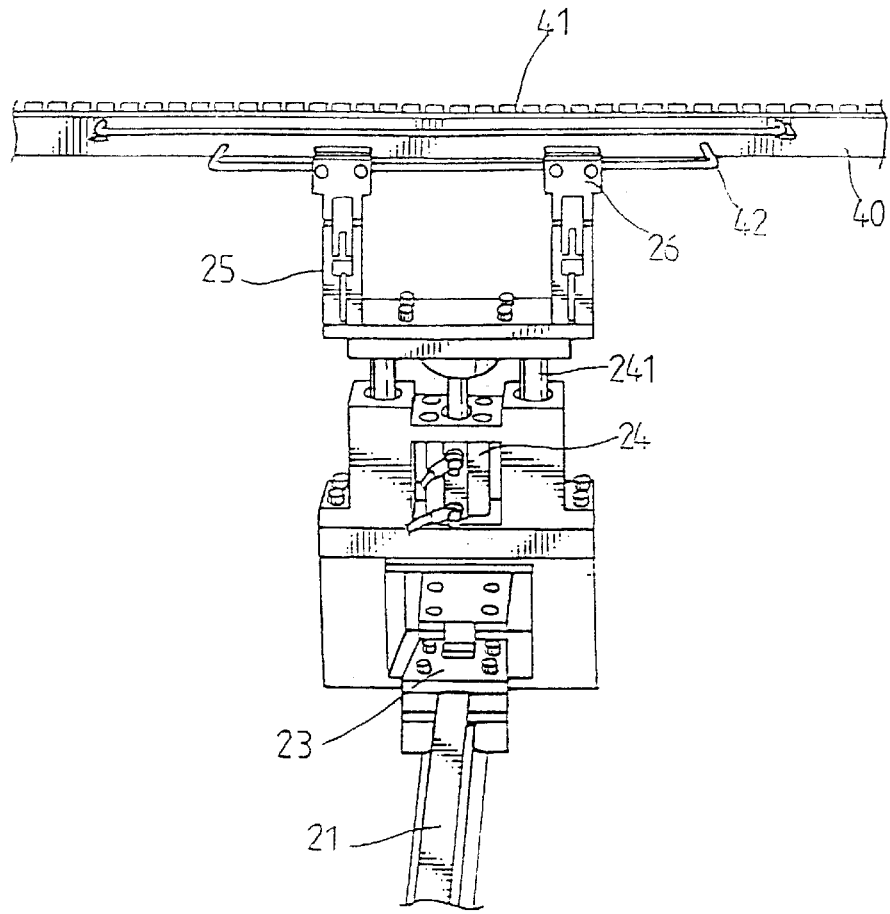
FIGS. 2, 3, 4 are partial perspective views each showing a portion of the welding device.
Figure 5:
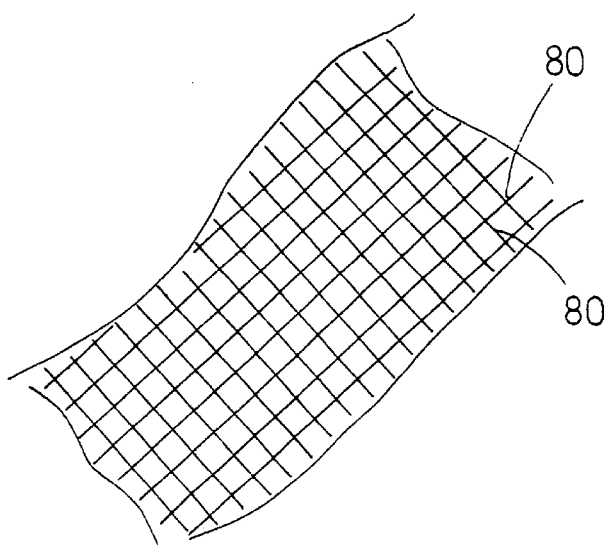
FIG. 5 is a partial perspective view showing a net member to be welded by the welding device in accordance with the present invention.
Figure 3:
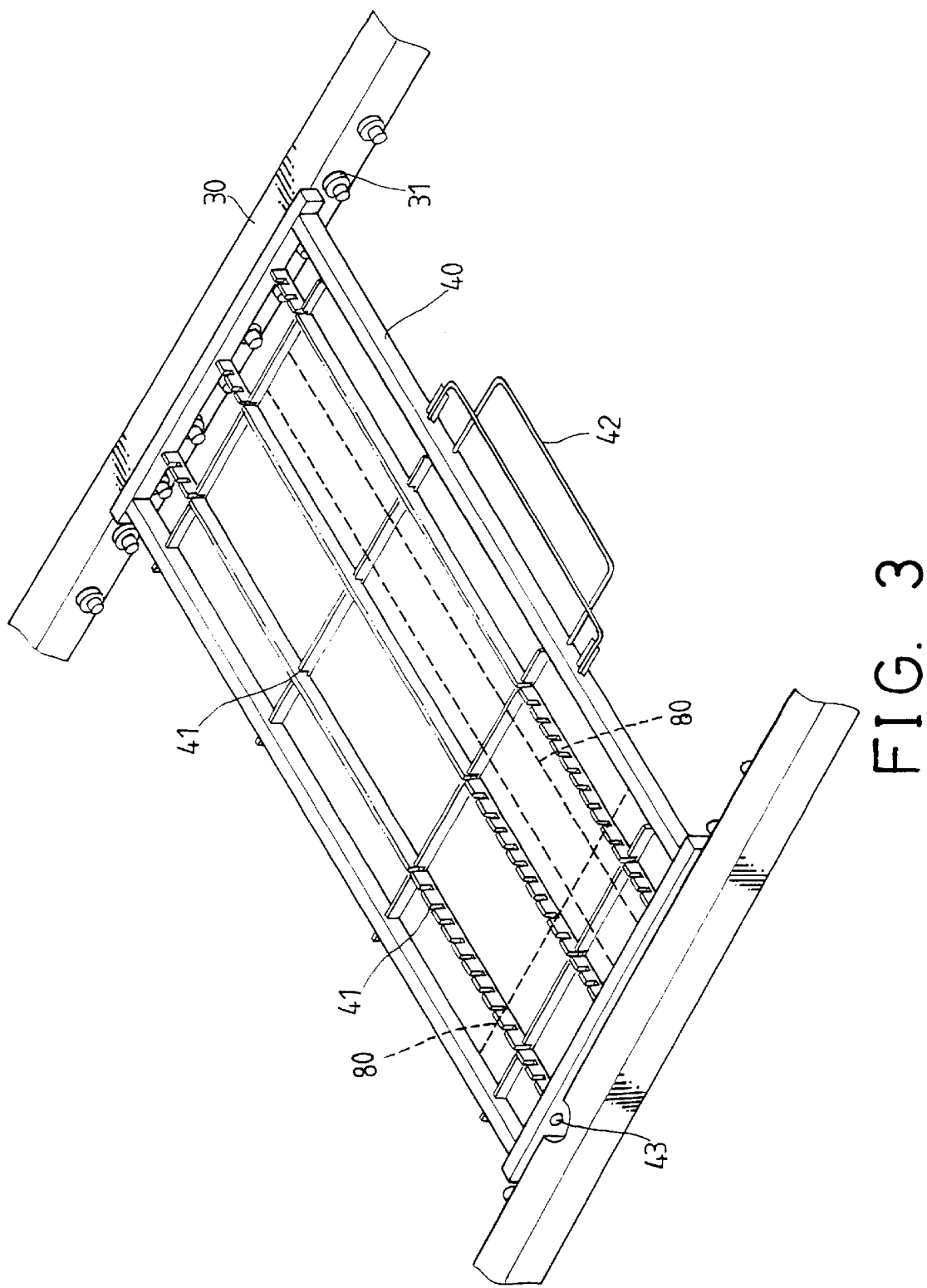
Figure 4:
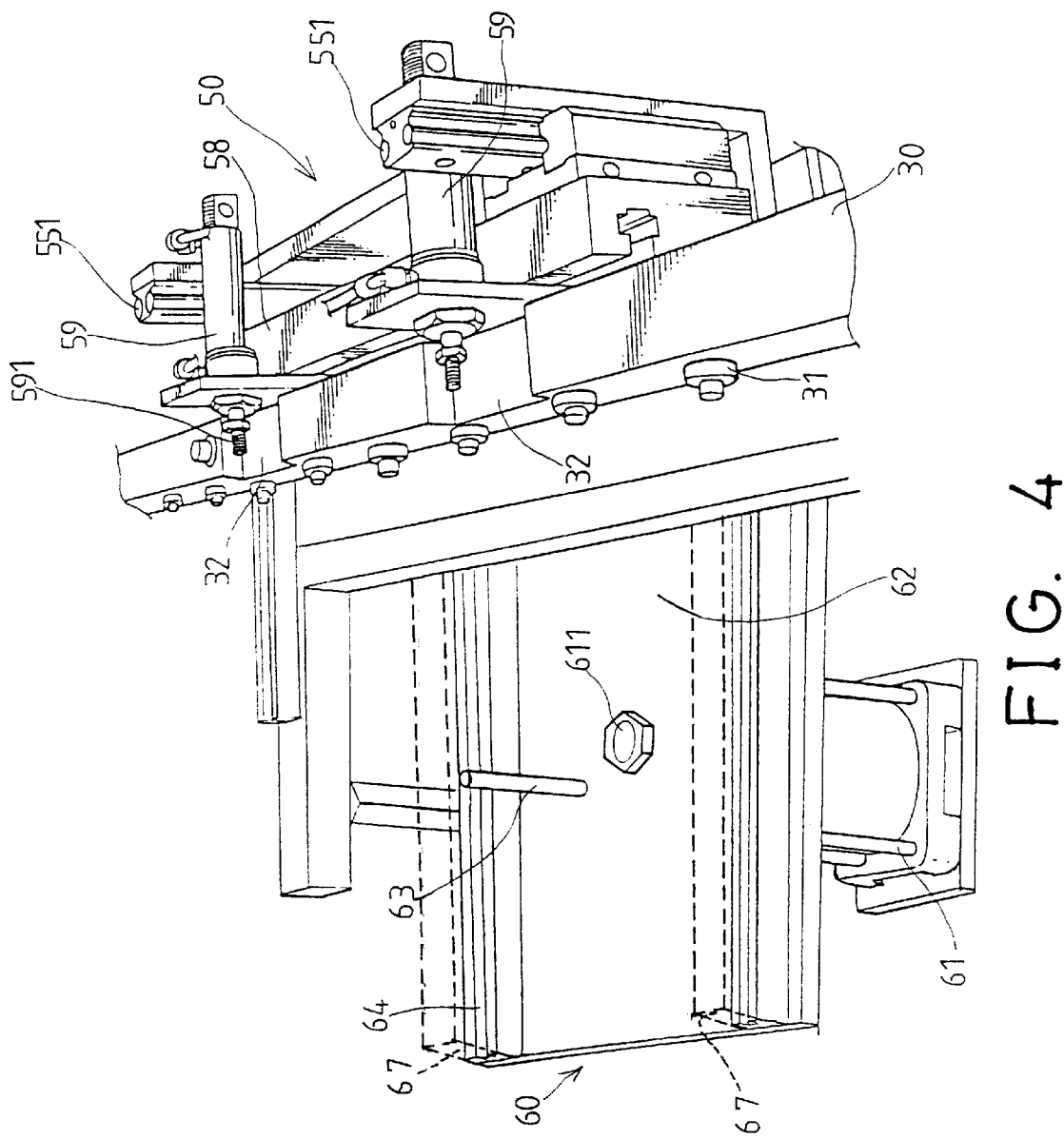

One or more tracks 30 are disposed on the base 17 and arranged in parallel to the moving device 20, and each includes a number of bearings or rollers or wheels 31 provided thereon, particularly provided on the inner portion thereof (FIGS. 3, 4). One or more frames 40, 400 (FIGS. 3 and 6–11) are slidably supported on the tracks 30 at the rollers 31 and movable along the tracks 31. The frames 40 each includes a number of slots 41 formed therein for supporting the wires 80 therein (FIG. 3), and each includes a handle 42 attached thereto, and each includes one or more orifices 43 (FIG. 3) formed in the side portions thereof. As shown in FIG. 2, the clamping devices 26 of the moving device 20 may engage with the handles 42 of the frames 40 for moving the frames 40 along the tracks 30 and for moving the wires 80 between the welding members 11, 12 (FIGS. 6, 7, 10, 11) and for allowing the wires 80 to be welded by the welding members 11, 12. The tracks 30 each includes one or more depressions 32 formed therein (FIGS. 1, 4). The upper welding members 11 may be moved downward toward the lower welding members 12, or the lower welding members 12 may be moved upward toward the upper welding members 11, or both the upper and the lower welding members 11, 12 may be moved toward the wires 80 for welding the wires 80 together.

An elevating device 50 includes one or more belts 51, such as the v-belts, the feed belts, the endless belts or the like, slidably supported in the base 17. One or more tracks 57 are provided and disposed in the base 17 and parallel to the belts 51. Two belts 51 and two tracks 57 are shown in FIG. 1. A post 53 is rotatably supported in the base 17 and includes one or more sprockets or gears 54 disposed thereon and engaged with the belts 51 for rotating or moving or feeding the belts 51. A motor 52 is coupled to the post 53 via a reduction gearing or the like for controlling the rotational movement of the post 53 and thus for controlling the moving speed of the belts 51. The belts 51 each includes a bracket 55 secured thereon and having one or more rails 551 provided thereon and extended upward therefrom (FIG. 4). The tracks 57 each includes an actuator 56 (FIG. 1), such as a hydraulic or pneumatic cylinder, slidably disposed thereon and and each includes one or more piston rods extended upward through the respective brackets 55. A slide 58 (FIG. 4) is secured to the piston rods of each of the actuators 56 and movable up and down along the rails 551 by the actuators 56. The slides 58 each includes one or more actuators 59 (FIG. 4), such as a hydraulic or pneumatic cylinder, slidably disposed thereon and and each includes a piston rod 591 extended therefrom and extendible through the depressions 32 of the tracks 30 to engage into the orifices 43 (FIG. 3) of the frames 40, 400 such that the frames 40, 400 may be held by the actuators 59 and may be elevated by the actuators 56 via the slides 58, and may be moved along the tracks 57 by the motor 52.

A removing device 60 (FIGS. 1, 4) includes an actuator 61, such as a hydraulic or pneumatic cylinder, disposed in the base 17 and includes a table 62 secured on the piston rod 611 of the actuator 61 and to be moved up and down by the actuator 61. A guide pole 63 is secured in the base 17 and extended upward from the bottom of the base 17 and slidably engaged through the table 62 for guiding the table 62 to move up and down along the pole 63 and for preventing the table 62 from rotating about the piston rod 611. The table 62 includes one or more tracks 64 each having a removing member 67 provided thereon for engaging with the wires 80 and for moving the wires 80 of the net member from the frames 40, 400.

Figure 6:
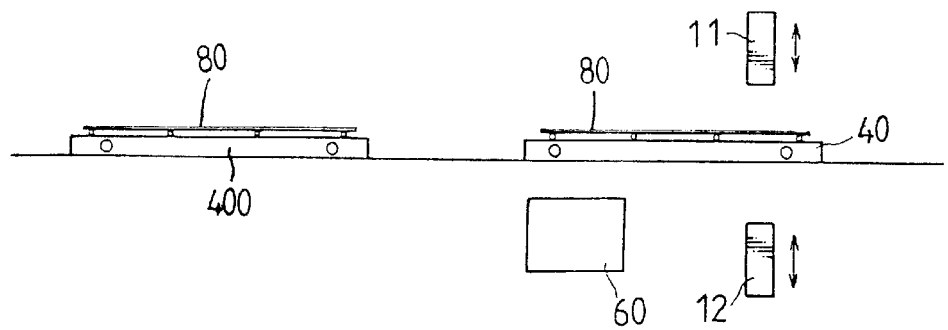
FIGS. 6, 7, 8, 9, 10, 11 are schematic views illustrating the operation of the welding device.
Figure 7:
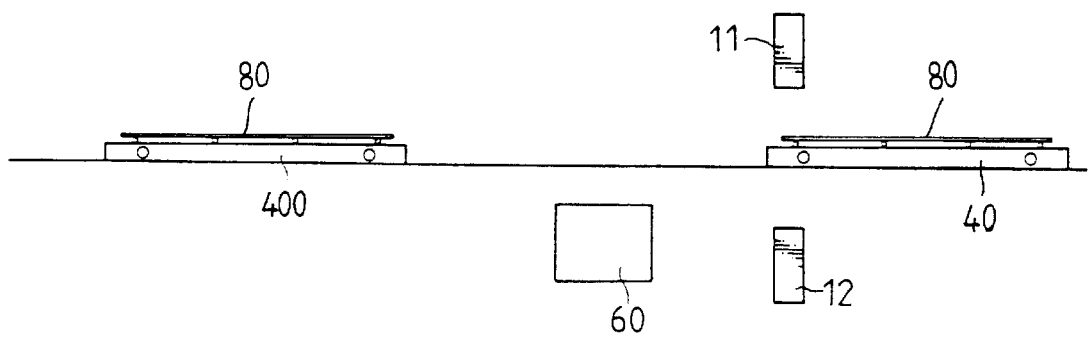
Figure 8:
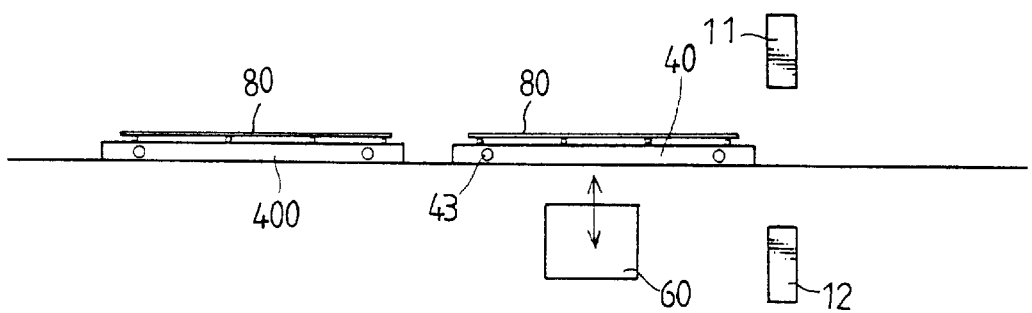
Figure 9:
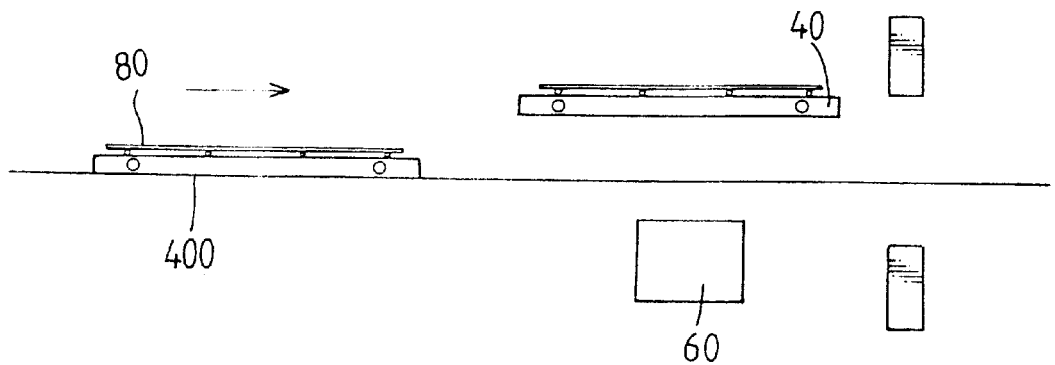
Figure 10:
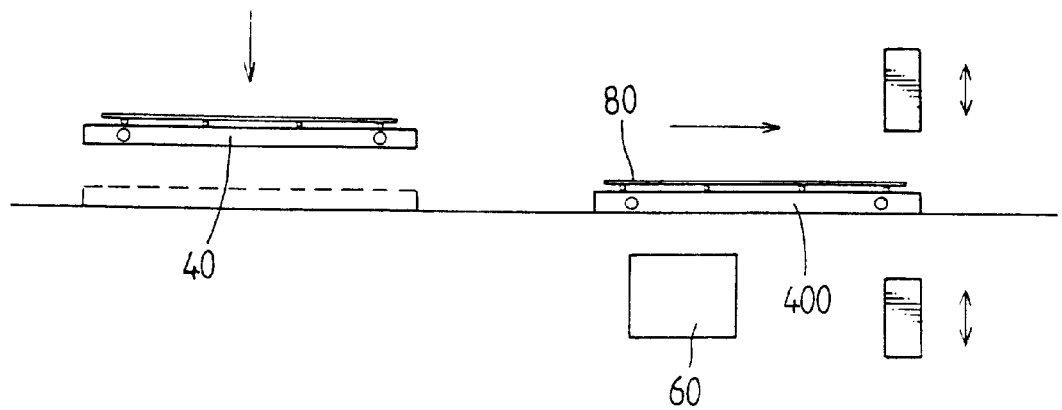
Figure 11:
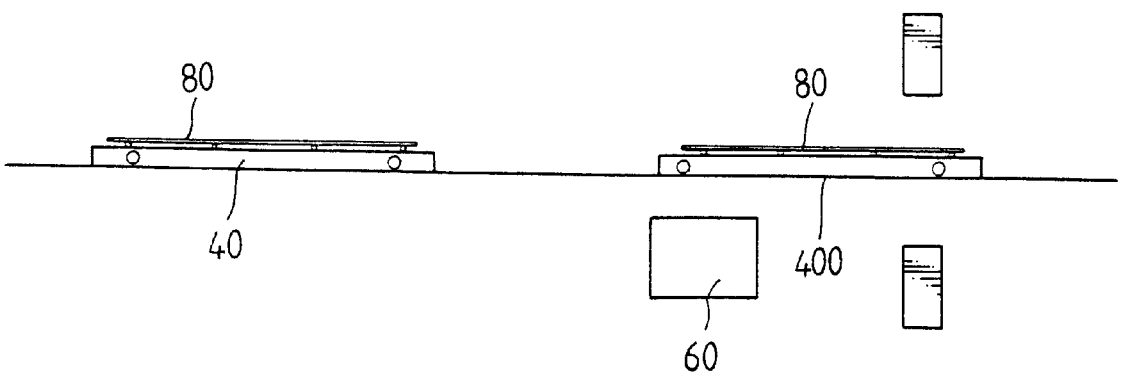

In operation, as shown in FIGS. 6–8, the wires 80 for forming the net members are arranged on the frames 40. 400 and cross to each other. The frame 40 may be moved between the welding members 11, 12 by the moving device 20, such that the wires 80 may be welded together by the welding members 11, 12, and may be moved rearward for moving the frame 40 back to the starting position (FIGS. 7, 8). The removing device 60 is then actuated to disengage the net member or the wires 80 from the frame 40 (FIG. 8). After the net member is removed from the frame 40, the frame 40 is elevated by the elevating device 50 (FIG. 9), and the other frame 400 having the wires 80 disposed thereon is then moved through the frame 40 and is moved between the welding members 11, 12 for allowing the wires 80 to be welded together by the welding members 11, 12 (FIGS. 10, 11). The welded wires 80 or the welded net member may then be removed from the frame 400 which may then be elevated for allowing the frame 40 to be moved between the welding members 11, 12 again.

Accordingly, the welding device in accordance with the present invention may be used for quickly welding the wires into the net member.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

What is claimed is:

1. A welding device comprising:
   a base,
   a plurality of welding members provided on said base,
   a frame for supporting a plurality of wires to be welded together,
   means for moving said frame between said welding members, and
   means for actuating said welding members to weld the wires together.

2. The welding device according to claim 1, wherein said base includes means for slidably supporting said frame in said base.

3. The welding device according to claim 2, wherein said supporting means includes a pair of tracks disposed in said base for slidably supporting said frame.

4. The welding device according to claim 3, wherein said tracks each includes a plurality of rollers provided thereon for engaging with said frame.

5. The welding device according to claim 1, wherein said moving means includes a belt slidably received in said base, means for moving said belt, and a clamping device disposed on said belt and movable in concert with said belt for clamping said frame and for allowing said frame to be moved by said belt moving means via said belt and said clamping device.

6. The welding device according to claim 5, wherein said frame includes a handle, said belt includes an actuator secured thereon, said clamping device is secured to said actuator.

7. The welding device according to claim 1 further comprising means for removing the wires from said frame.

8. The welding device according to claim 7, wherein said removing means includes a table slidably received in said base, a removing member disposed on said table, means for moving said table up and down to remove the wires from said frame.

9. The welding device according to claim 8 further comprising means for guiding said table to move up and down relative to said frame.

10. The welding device according to claim 8 further comprising means for preventing said table from rotating relative to said frame.

11. The welding device according to claim 1 further comprising means for elevating said frame.

12. The welding device according to claim 11, wherein said elevating means includes a pair of slides, two actuators disposed on said slides respectively and each having a piston rod extendible to engage with said frame and to retain said frame in place, and means for moving said slides up and down to move said frame up and down.

13. The welding device according to claim 12, wherein said elevating means includes a pair of brackets slidably supported in said base and each having at least one rail extended therefrom for slidably supporting said slide respectively.

14. The welding device according to claim 12, wherein said base includes a pair of tracks disposed therein for slidably supporting said frame, said tracks each includes at least one depression formed therein for slidably receiving said piston rod of said actuator respectively.

15. The welding device according to claim 1 further comprising a second frame slidably supported in said base for supporting wires to be welded together.

\* \* \* \* \*